INVENTOR
GENUNG L. CLAPPER
BY Paul M. Brosnan
AGENT

March 28, 1967 G. L. CLAPPER 3,311,895

ADAPTIVE LOGIC SYSTEM WITH ARTIFICIAL WEIGHTING OF OUTPUT SIGNALS FOR ENHANCED LEARNING

Filed Dec. 30, 1963 5 Sheets-Sheet 3

United States Patent Office 3,311,895

Patented Mar. 28, 1967

3,311,895

ADAPTIVE LOGIC SYSTEM WITH ARTIFICIAL WEIGHTING OF OUTPUT SIGNALS FOR ENHANCED LEARNING

Genung L. Clapper, Vestal, N.Y., assignor to International Business Machines Corporation, New York, N.Y., a corporation of New York Filed Dec. 30, 1963, Ser. No. 334,240

8 Claims. (Cl. 340—172.5)

Figure 1:
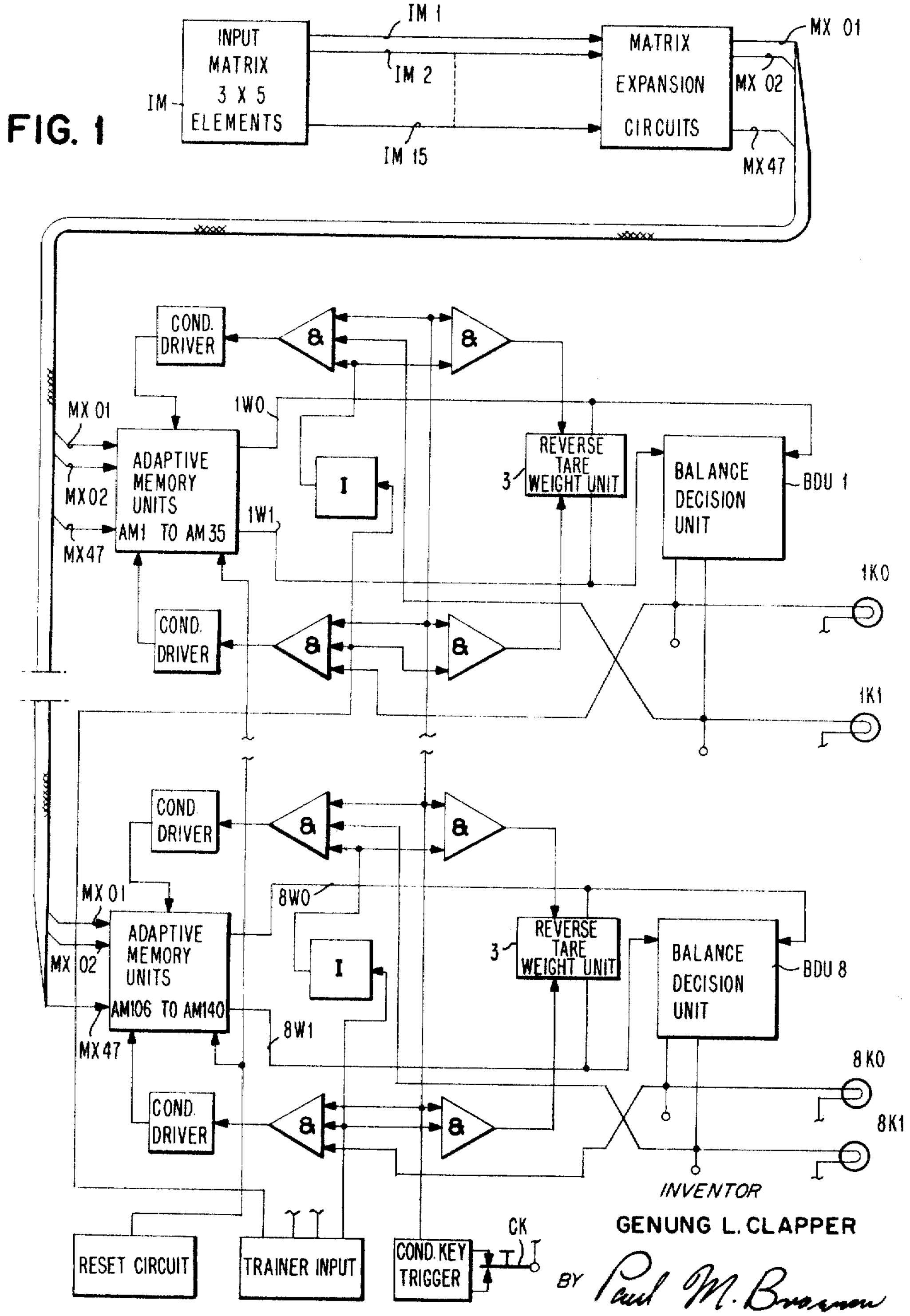

This invention relates to adaptive logic systems and particularly to an improved adaptive logic system in which the outputs of adaptive memory units in the system are artificially weighted to enhance the learning or conditioning of the system.

In a co-pending application, Ser. No. 331,832, filed Dec. 19, 1963, for Genung L. Clapper, there is disclosed and claimed an adaptive logic system utilizing a plurality of metastable adaptive memory units having a neutral or null condition and a plurality of stable conditions on each side of the neutral condition. Displacement or conditioning causes the adaptive memory unit to supply, on an associated set of output lines common to a plurality of the memory units, voltages which indicate the degree to which the memory unit has been conditioned from one side or the other of its neutral state. Equal outputs indicate that the unit is in its neutral or null condition.

All of the outputs from a bank of memory units common to a particular output condition are supplied via the pair of common output lines to a balance decision unit which is arranged and constructed in such manner that it provides a ternary output indicative of a balance of outputs on two weighted output lines; that is, both outputs will be provided if both of the weighted output lines are equal in their weight; that is, the voltage thereon is equal. If the output lines are not balanced, the balance decision unit will so indicate the direction of unbalance.

To accelerate the learning process, it has been found that artificially weighting the outputs on the output lines from the memory banks will enhance the learning condition, thereby shortening the time required for training the system to the responses desired.

Accordingly, a prime object of this invention is to provide an improved adaptive logic system in which artificial weights are added to the outputs of the adaptive memory units in the system to enhance the learning or conditioning operation.

Another object of the invention is to provide an adaptive logic system in which the outputs of the adaptive memory units are supplied on a pair of common output lines, the condition of the memory units being indicated by a balanced or unbalanced condition of the voltages present on these lines, and in which means are provided for artificially increasing or decreasing the weights on the one or the other of the lines to enhance the conditioning operation.

Still another object of the invention is to provide an adaptive logic system of the type described in which the artificial weighting is only applied during the conditioning operation and is thereafter removed.

Another object of the invention is to provide an adaptive logic system of the type described in which the weighting is maintained on a continuous basis throughout the conditioning operation.

A further object of this invention is to provide an adaptive logic system of the type described in which the weighting is additive to the weights already present on the lines as a result of the outputs of the memory units.

Still a further object of this invention is to provide an adaptive logic system of the type described in which the artificial weighting is in a reverse direction to that provided by the adaptive memory units.

Briefly described, the subject system constitutes an adaptive logic system in which the adaptive memory units provide ternary outputs including a balance condition on a pair of output lines or an unbalanced condition with one line having a voltage higher than the other. In this system, suitable weighting units are provided for each set of adaptive memory output lines, which weighting units are under control of the conditioning circuits. These weighting units supply additional voltages to the output lines as selectively determined by the conditioning operation so that an artificial or tare weight is added to the outputs of the adaptive memory units in addition to that normally provided by them during the learning operation. This tare weight may either be additive to the existing output provided by the adaptive memory units or it may be a reverse tare weight condition in which it is subtractive from the weights already on the lines. Also, the weights may be supplied only during the conditioning operations or may be supplied continuously on the output lines in the same fashion as the outputs from the adaptive memory units.

The foregoing and other objects, features and advantages of the invention will be apparent from the following more particular description of preferred embodiments of the invention, as illustrated in the accompanying drawings.

In the drawings:

FIG. 1 is a diagrammatic view showing the entire system in a simplified fashion and employing a reverse tare weight unit for each of the memory banks.

Figure 2A:
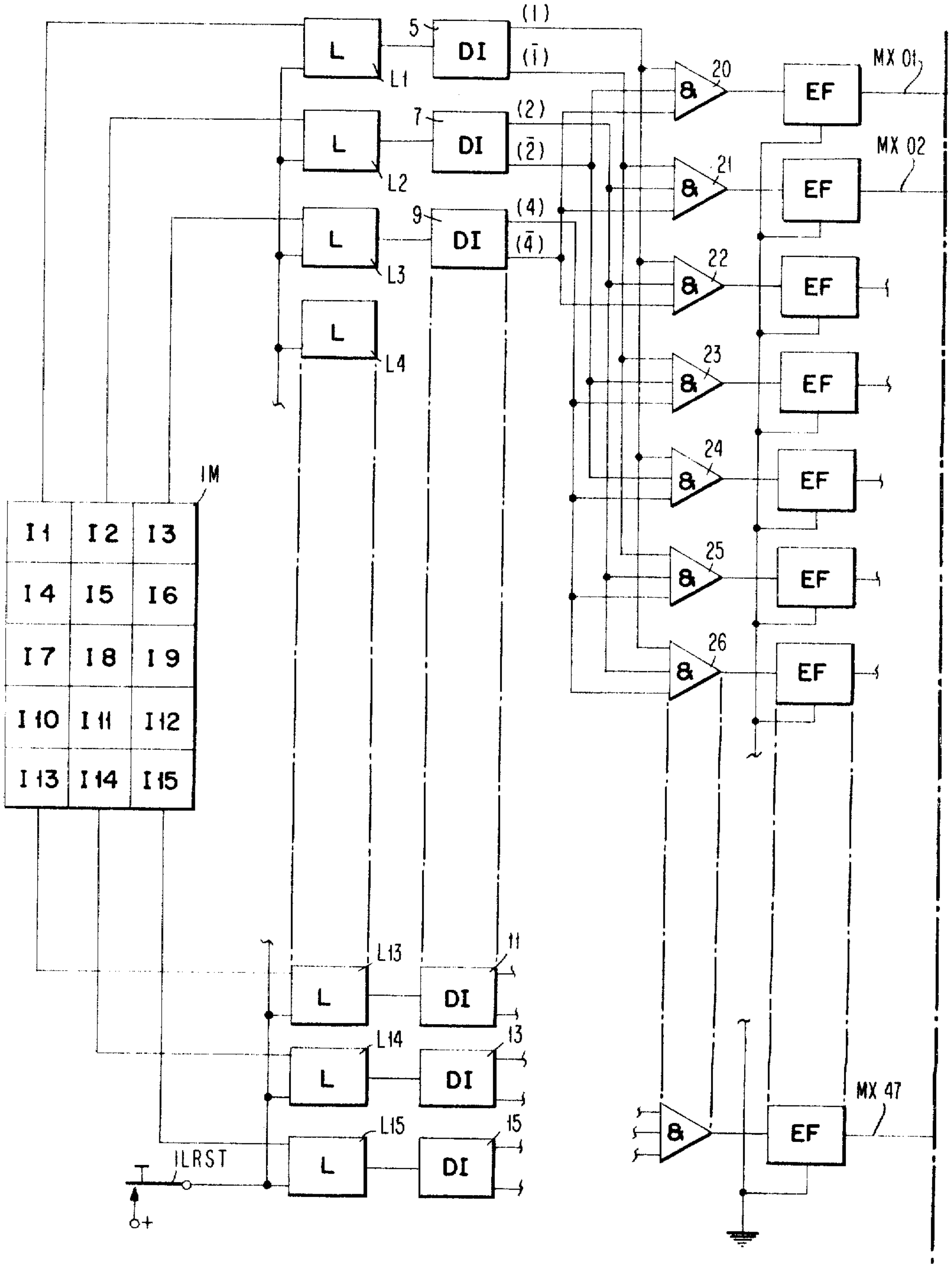
Figure 2B:
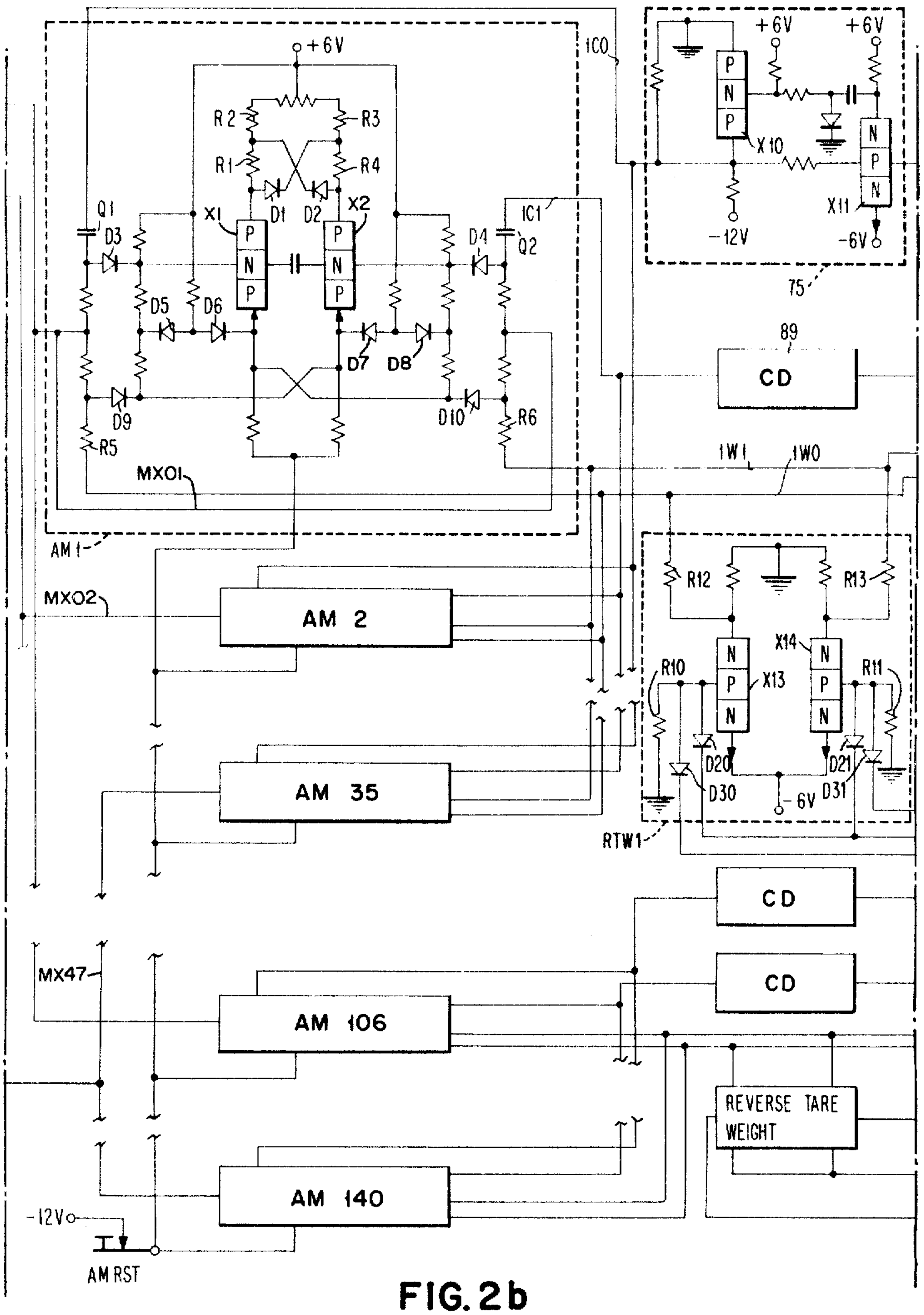
Figure 2C:
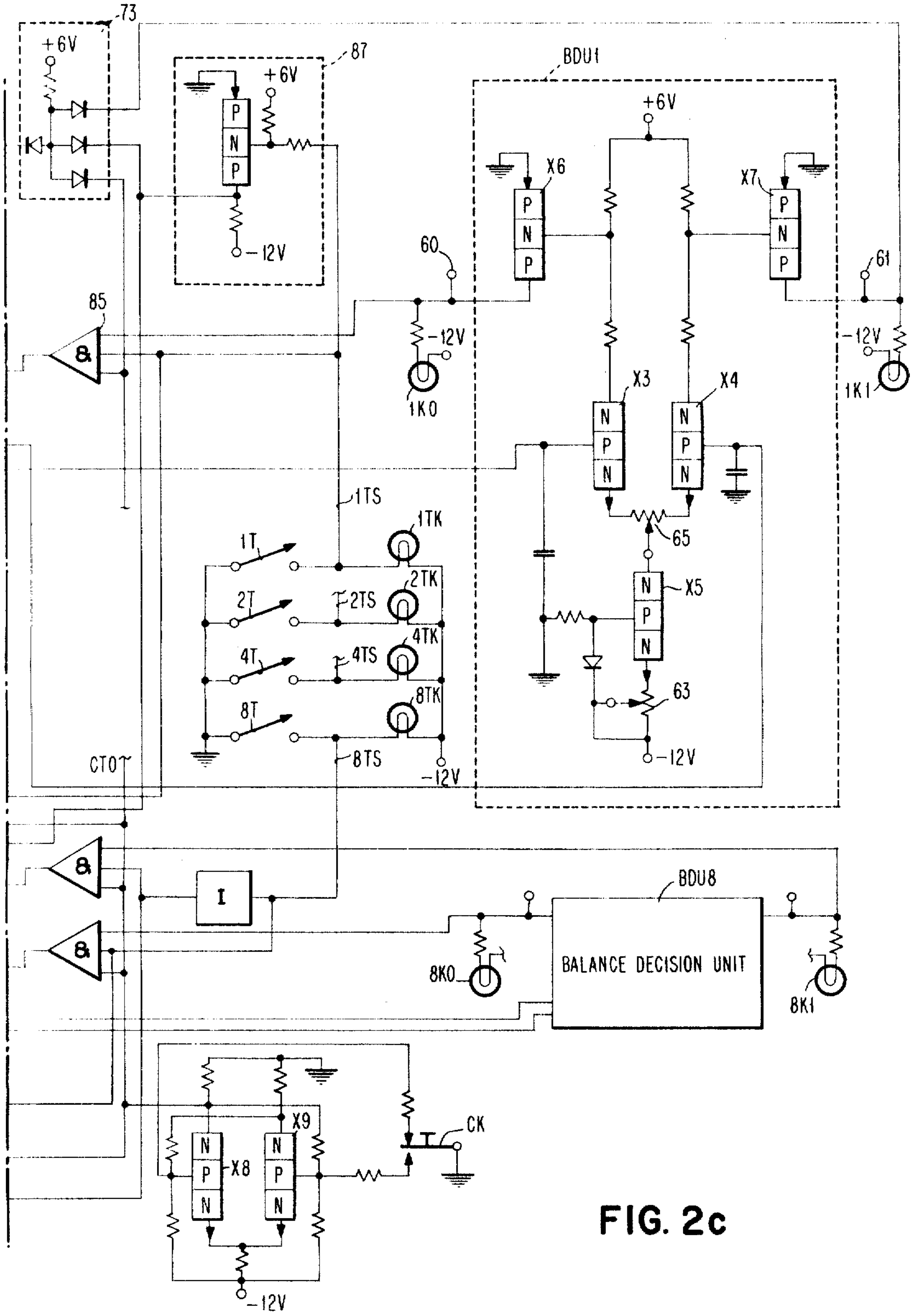

FIGS. 2*a*, 2*b* and 2*c*, placed side by side in the order named, are diagrammatic views in more detail of an adaptive logic system employing the first embodiment of the invention in which the details of the reverse tare weight units are fully shown in connection with the details of the system.

Figure 3:
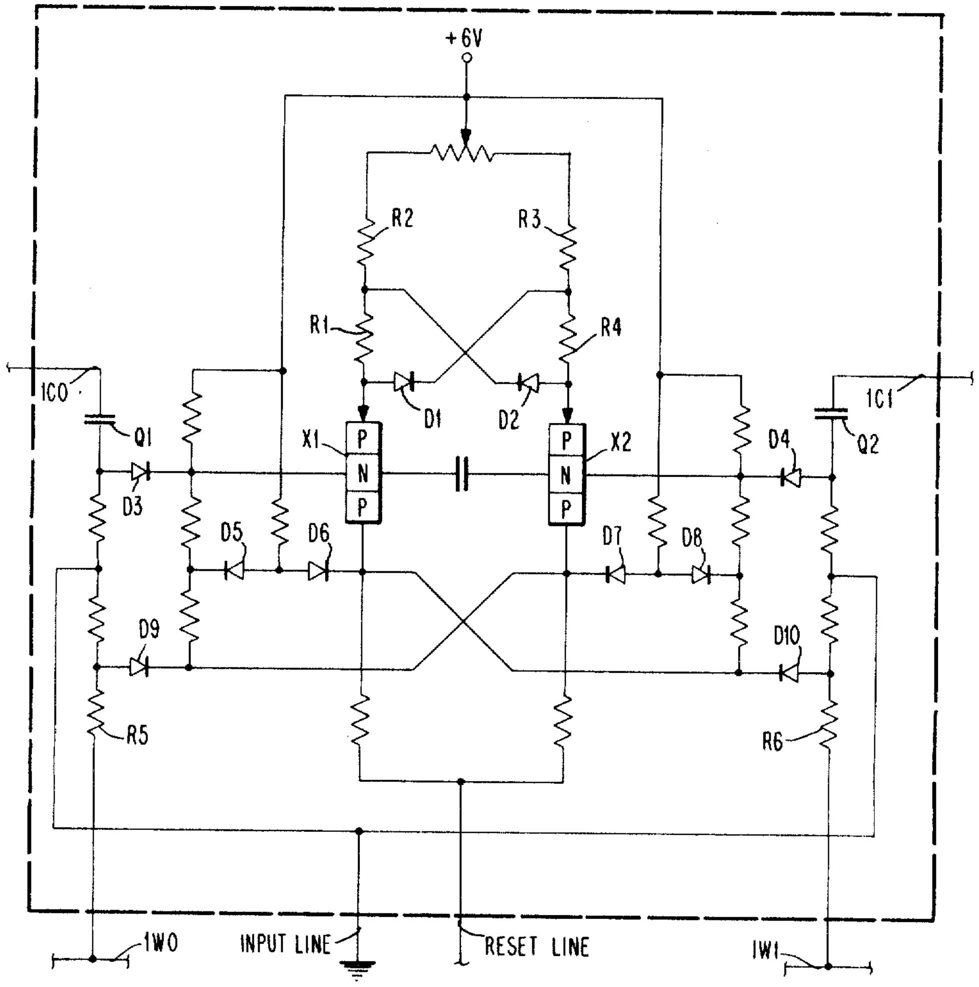

FIG. 3 shows in diagrammatic form an adaptive weight unit which may be utilized in the system shown in FIGS. 1 and 2, to replace the reverse tare weight units shown in the embodiment illustrated in FIGS. 1 and 2.

Referring to the general view shown in FIG. 1 of the drawings, the input to the system is derived from an input matrix IM which may have, for example, 15 elements arranged in rows of three and columns of five, from which 15 output lines, such as the lines IM1, IM2 through IM15 are supplied, these lines having signals thereon when the associated one of the elements in the input matrix is active. These input lines are connected to the matrix expansion circuits, to be later described, in which output signals are derived for the various combinations of inputs supplied thereto. These expanded or transformed outputs are designated by coded numbers, three of which are indicated as MX01, MX02 and MX47.

The expanded outputs are supplied in parallel to a plurality of banks of adaptive memory units, only two such banks being shown in FIG. 1, the remainder being arranged in identical fashion. One such bank of adaptive memory units is provided for each output condition which is to be indicated and each of the banks contains a number of adaptive memory units equal to the number of inputs supplied thereto from the matrix expansion circuits. For example, the first bank of adaptive memory units contains adaptive memory units AM1 through AM35. The intervening two banks of adaptive memory units for the second and fourth orders of binary output are not shown, but the last bank, which would be for the binary output order of 8, will contain the adaptive memory units AM106 to AM140. As can be seen from the drawings, the inputs are supplied in parallel to each of these banks of memory units. Each memory unit in the bank is of a type which will be described in detail later; suffice it to say for the present that the memory unit, upon a supply thereto of suitable input and conditioning pulses, will provide an output on one or the other or both of a pair of output lines, depending upon whether or not the conditioning signals are such as to cause the memory unit to be displaced from one side or the other of a neutral condition.

The outputs from each of the adaptive memory units are supplied to a set of common output lines associated with the particular memory bank, such as the lines 1W1 and 1W0, associated with the first memory bank, and lines 8W1 and 8W0, associated with the last memory bank. The voltages on these output lines will be balanced or equal or will be unbalanced in accordance with the condition of the input-activated memory units in the memory banks to which they are connected. Thus, the condition of the adaptive memory units is reflected in the balanced or unbalanced condition of the output signal lines whenever an input pattern is presented.

The outputs on the common output lines are supplied to a balance decision unit, one for each memory bank, such as the units BDU1 and BDU8. These balance decision units are sensitive voltage comparison devices, which monitor the condition of the voltage on the common output lines supplied thereto and provide output signals indicative of the balance or the unbalance of the voltages on these lines. For example, if the balance output line 1W0 has a slightly higher voltage than the line 1W1, then an output signal is supplied from the balance decision unit to the output terminal associated with the indicator lamp 1K0, indicating that the zero condition is present for the output of the first memory bank. Conversely, if line 1W1 has a higher voltage than 1W0, the indication lamp 1K1 will be lighted. In the event that the lines are balanced, or nearly so, within the tolerance of the balance decision unit, outputs will be present on both outputs from the balance decision unit and, therefore, both output indicator lamps 1K0 and 1K1 will be illuminated. Additional terminals are provided as shown, which may be supplied to further units, not shown, including decoding and utilization devices for utilizing the information supplied from the adaptive memory system. Since the ultimate use of the information stored by the system is not germane to the structure and operation of the system itself, these further details have not been shown.

In order to condition the adaptive memory units, signals from a trainer input are supplied both in normal and inverted form to the adaptive memory via associated AND circuits and condition drivers as shown. In addition to the trainer inputs, the AND circuits are supplied with an input from the opposing output line of the balance decision unit as well as an input from a conditioning key trigger which serves to render the conditioning circuits active only when desired. In operation, the trainer inputs are set for the desired output with a given input and, if the balance decision unit does not put out a signal of the suitable value, the output line from the balance decision unit combines with the inputs from the trainer input and a condition key trigger and via the condition driver, which is adapted to drive all of the memory units, serves to further condition the adaptive memory units which have input supplied thereto to increase or decrease their weight as necessary. After the adaptive memory units have been suitably trained, it is then possible to present various input combinations thereto and have the adaptive memory units supply appropriate outputs to the output circuits that cause the desired output to be produced.

Additionally, the signals from the trainer input and the condition key triggers, shown in FIG. 1, which are supplied via the condition drivers to the adaptive memory units, are also supplied via suitable AND circuits to the inputs of an auxiliary weighting unit, here designated as a "reverse tare weight unit." One such reverse tare weight unit is provided for each of the memory banks, but, as with the remainder of the system, only the two units associated with the banks 1 and 8 are shown herein. The reverse tare weight units are constructed and arranged in such manner so that, when a signal is supplied thereto as a result of the coincidence of an input signal or its inverse from the trainer input and the output of the condition key trigger, one side or the other of the reverse tare weight unit will be activated and will operate in such manner as to subtract a predetermined amount of potential existing on the output lines from the adaptive memory units, such as the lines 1W0 and 1W1. This reverse or negative tare weight is effective during the conditioning operation to tip the weight or the balance on the output lines from the adaptive memory units in the opposite direction from that which is desired. That is, more weight must then be accumulated in order to overcome the reverse tare weight. The result of an addition of such reverse tare weight is that the adaptive recognition "learns" faster and the sums which are accumulated are larger. This increases the distance or values between weights of opposite sides since the reverse tare is only effective during conditioning and is removed when the conditioning ceases.

Referring now to the detailed drawings, FIGS. 2*a*, 2*b*, and 2*c*, taken together, the input to the system is considered to be derived from a plurality of input devices which may be arranged in matrix fashion, designated by the reference character IM, denoting input matrix. The matrix shown is a 3-by-5 matrix; i.e., there are three elements per row and five rows. However, it is to be understood that any number of rows and columns could be utilized. Each of the input elements is distinctively labeled as shown, I1, I2, I3, I4, etc. These elements may be, for example, photocells arranged in a matrix for detecting a pattern projected thereon. The outputs from each input element in the matrix IM; i.e., the elements I1 through I15, inclusive, are supplied as inputs to latch or trigger storage circuits indicated by the rectangles designated with the letter L and with the reference characters L1 through L15, only seven of which are shown. These latches are of conventional construction and arranged in such manner that an input thereto from the associated input element of the input matrix will cause the latch to be set ON and the latch will remain in its ON condition unless and until the input latch reset button ILRST is depressed, at which time energy is supplied to the reset circuits of all of the latches to restore them to their normal or OFF condition. The input latches L1 through L15, accordingly, serve as an input storage medium which provides input information to the subsequent circuitry. It should be noted that, if the input from the matrix is persistent, the latches can be eliminated.

Each of the input latches L1 through L15 have associated therewith a double inverter such as the ones indicated by the rectangles with the designation DI, reference characters 5, 7, 9, 11, 13 and 15, which constitute six out of the total of fifteen which would be provided in the arrangement shown. Each of the double inverters is arranged in a conventional manner to provide a normal and inverted output on the two output lines associated therewith. For example, the output lines associated with the double inverter 5 are designated by the reference characters (1) and ($\overline{\mathbf{1}}$), indicating respectively an output line on which the value $\overline{1}$ is indicated and another output line in which the value of 1 is indicated. When no signal is supplied to the double inverter from the associated latch, the negative output line is energized and, when a signal is supplied from the latch, the positive output line is energized. Similar outputs are provided on each of the fifteen inverters. In accordance with binary coding notation, the first three inverters 5, 7 and 9 have the output lines 1, 2 and 4 and their negatives provided therefrom.

The double inverters provide outputs which are combined in a plurality of AND circuits to provide in the present case seven expanded input or transformed input signals for each three element matrix row. Since each row of the matrix is expanded in similar fashion, only the detailed arrangement for expansion of the first row will be considered. As shown, there are seven AND circuits 20 through 26 provided, each having three inputs thereto and having a single output which is energized when and only when a signal is provided at each of the three inputs to the particular AND circuit. These AND circuits are connected so that they represent all of the possible combinations of outputs from the double inverters 5, 7 and 9 except the null combination; that is, the combination which exists when all of the negative output lines of the three inverters are energized, this corresponding to a condition in which none of the inputs in the input matrix have been energized. For instance, an AND circuit 20 provides an output when there has been an input combination constituting a 1 and $\overline{2}$ and $\overline{4}$ condition for the first row, so that a prefix 0 would be used. This indicates an input to the first element of the first row, but no input to the second and third element of the first row.

The outputs from the AND circuits 20 through 26 are supplied through suitable emitter followers as designated by the rectangles enclosing the reference characters EF, these being provided with a suitable gating input common to all of the emitter followers and grounded as shown. Thirty-five of the emitter followers EF are provided in the system, for each of the possible matrix expansion outputs from the matrix expansion circuitry. The outputs of the emitter followers are designated by the reference character MX followed by a code designation indicating, first, the row and, second, the binary number designation for that particular line. Only three examples of these outputs are shown, MX01, MX02 and MX47, which are respectively the binary one output from the zero row or topmost row of the matrix, the binary two output from the zero or topmost row of the matrix and the binary seven output from the fourth or lowermost row in the matrix, the rows being numbered consecutively 0, 1, 2, 3, 4, from top to bottom.

A single transformed output is produced for the expansion of active elements in each row of the matrix. Thus, five out of thirty-five output lines will be active for input patterns having elements in five rows of the input matrix.

The 35 output lines from the matrix expansion circuits are carried in multiple to each one of a plurality of banks of adaptive memory units, each bank having 35 units therein corresponding to the 35 matrix expansion lines. The number of banks is determined by the number of binary outputs by which it is desired to indicate the output conditions for a given set of input conditions supplied to the input matrix. In the present instance it will be assumed that four banks of adaptive memory units of 35 units each will be utilized to provide binary outputs which, in binary coded fashion, namely, 1, 2, 4, and 8, can supply a total output considered decimally zero to fifteen. Thus, there will be a total of 140 adaptive memory units, only one of which will be described in detail since the structure of all are similar.

As shown in FIG. 2*b*, the adaptive memory unit AM1 includes the apparatus shown in detail in the dotted rectangle designated AM1. These units are also disclosed and claimed in a copending application, Ser. No. 334,397, filed Dec. 30, 1963, for Genung L. Clapper.

Each of the memory units includes a pair of PNP transistors, such as X1 and X2, together with a plurality of diodes such as the diodes D1 through D10, and resistive and capacitive elements which, in combination, form a metastable storage device having a neutral or reset condition or state and having a plurality of settable conditions in either direction from the neutral condition or state. In the present instance, there are two stable conditions or states on either side of the neutral state so that, in effect, an adaptive memory device in the present arrangement has five stable conditions or states. Each of the memory units, such as AM1 has an activating input which is supplied from the matrix expansion circuits, such as the line MX01. All other lines from the matrix expansion circuits are connected to the corresponding adaptive memory units in that particular memory bank. The input signal on line MX01 from the matrix expansion circuit combines with the supply of conditioning pulses to the 5-state trigger to move it from one state to another by circuitry including diodes D3 and D4 and also controls the supply of weighted output signals to the output lines by circuitry including diodes D9 and D10. The diodes D3 and D4 are associated with the pair of resistor-diode gates controlling the conditioning in the arrangement shown and diodes D9 and D10 are associated with the resistor-diode gates controlling the summation of the weights on the output lines. The central part of the circuit is a 5-state trigger which is basically an Eccles-Jordan flip-flop modified to have three additional stable states by the use of diode pairs D1, D2; D5, D6; and D7, D8.

When power is supplied to the circuit, or following a resetting operation which is provided by operation of the reset key AMRST, the diodes D1 and D2, which are cross-connected in the emitter circuits of the transistors X1 and X2, provide a stable mode at a midpoint or a neutral state for the trigger. At this time equal collector current flows in X1 and X2 and the voltage level at the collectors is equal at some predetermined potential, say, for example, at −4 volts. The emitters of X1 and X2 are also at equal voltage levels and the emitter impedance taps are at a higher level; that is, the intermediate taps between the resistors such as R1, R2 and R3, R4. Thus, D1 and D2 are both reverse biased. The emitter impedances are therefore not connected in parallel and, since the emitter impedance is greater than the collector impedance, the effective gain of each stage, that is, either side of the trigger, is less than unity. Thus, the circuit is stable at this point and the net weight applied to the balanced output lines from the unit will be considered to be zero since equal current flows in the resistors R5 and R6, which are connected to the common summation output lines for all of the memory units in the bank and which are designated by the reference characters 1W0 and 1W1.

A conditioning pulse on the common conditioning line for zero conditioning for the first bank, namely, 1C0, supplied along with an input on the line MX01, will cause a positive transient to be supplied to the base of transistor X1 via capacitor Q1 and diode D3. This reduces the collector current of X1 and causes the collector voltage to start dropping towards some negative value, such as −12 volts, to which the collectors are returned. At the same time the emitter of transistor X1 starts rising towards +6 volts and the diode D1 will conduct. Increased current flowing in transistor X2 causes the collector voltage to rise until it is equal to the voltage at the divider tap in the impedance from the collector of transistor X1 to the base of X2, at which time the diodes D7 and D8 will conduct equally. With both diodes D7 and D8 conducting, a low impedance inverse feedback path is established from the collector of transistor X2 to the base thereof which stabilizes the trigger at a first stable condition on one side of the neutral point, where the voltage may be, for example, −6 volts at the collector of transistor X1 and −3 volts at the collector of transistor X2 with a difference therebetween of −3 volts. This might be indicated as the −1 weight condition. This condition is indicated on the summation lines because the current flowing to the summation line 1W0 is now greater than that flowing to the 1W1 line since the collector of transistor X2 is more positive than the collector of transistor X1. Another pulse on the condition zero line for the first memory bank; namely, 1C0, still in the presence of an input signal on line MX01, would reduce the current in X1 still further. The collector of transistor X1 would drop to its lowest level, say for example, —10 volts, as transistor X1 approaches cutoff and X2 approaches saturation, raising its collector voltage to some value such as —1 volt. The trigger is now stable in a second condition on one side of the neutral point which might be designated as a —2 weight and, therefore, the current supplied to the 1W0 line is now a maximum of —2 units.

The state of the trigger can now be changed to add increasing weight to the summation output line 1W1 by applying pulses to the condition 1 input line 1C1 at the time that a signal is present on the common input to the two sides of the trigger on line MX01. These inputs will be supplied to the base of transistor X2 via capacitor Q2 and diode D4 and the first pulse will move the trigger from the —2 weight condition to the —1 weight condition where diodes D7 and D8 would again stabilize the circuit. A second pulse on the line 1C1 will bring the trigger to its neutral state as originally described. A third pulse would bring the diode pair D5 and D6 into action and, as a result, the trigger will be set to a condition where the collector voltage for X1 will be at approximately —3 volts, whereas the collector voltage for the X2 will be at —6 volts. The difference between the voltage of the collector of X1 and the collector of X2 will be +3 volts and this may be designated as the +1 weight condition. A fourth pulse will cause the transistor X2 to approach cutoff and transistor X1 to approach saturation, which would then stabilize the trigger in a state where the collector voltage of X1 is approximately —1 and that for the collector of X2 is approximately —10, which may be considered a +2 weight for the trigger. Thus, the adaptive memory unit AM1 may be changed through its full range of five stable states and can be reversed as often as necessary by applying conditioning pulses to the appropriate line at the time that an input signal is present. Conditioning pulses are applied in common to all of the adaptive memory units in any one bank when adaptation is necessary via circuitry to be subsequently described. Only those adaptive memory units which are activated by inputs from the matrix expansion circuits will respond to such conditioning. It should be noted that the units which do not have an input signal from the matrix expansion circuits cannot change state at the time the conditioning pulses are applied nor do they affect the summation of weights on the summation output lines for their particular bank since the input lower level is below the lowest level that the collectors of the transistors in the adaptive memory unit can reach. Moreover, the units having zero weights; i.e., in their neutral state, cannot add to the net weight on the summation output lines, even in the presence of an input signal thereto, because current flows equally into the summation output lines and, accordingly, the difference between the lines is not changed.

In order to determine the balance between the summation output lines from the individual banks of memory units, such as the balance between the lines 1W1 and 1W0, a plurality of balance decision units are provided, one for each bank of memory units. In the present instance, since there would be four banks of memory units, each associated with the binary orders 1, 2, 4, 8, in the output, there would be four balance detection units, only two of which are shown in the drawings; namely, BDU1 and BDU8. It will be understood that all of these units are similar and a detailed description of the balance decision unit BDU1 will suffice for all units in the system. The balance decision units examine the summation output lines from the memory units for balance or unbalance. When the memory is unconditioned so that all of the adaptive memory units are in their neutral state, the inputs to the decision unit will be alike and all patterns will give the intermediate or "don't know" response which could be considered a neutral state for the decision unit. The neutral state permits conditioning in either direction. After conditioning, the memory weights will sum up to give a learned response for particular input patterns and, in making a decision, no fixed threshold is used but a comparison is made between the zero and the one summation output line; the line with the highest or most positive voltage determining the output. This determination is made by the balance decision unit comprising a sensitive voltage discriminator device which includes a pair of emitter-coupled transistors X3 and X4 with a transistor X5 acting as a constant current source to increase the sensitivity of the arrangement.

First consider the case where no input pattern is present in the matrix so that the summation output voltages are the same. At this time transistors X6 and X7 which are connected in the collector circuits of X3 and X4 will conduct by virtue of the equal current distribution between the transistors X3 and X4. X5, acting as a constant current device, limits the current to a particular value, say for example, 3 milliamperes. This current divides equally between transistors X3 and X4 so that each conducts one half of the total; i.e., 1.5 milliamperes. With suitable circuit parameters then, a smaller current flows in the base circuits of the transistors X6 and X7 to bring these to saturation. Thus, in this present instance, an equality of the inputs to the decision unit is effective to energize both of the outputs. The outputs of the balance decision unit may be supplied to a suitable output terminal such as 60 and 61, and the outputs may also be indicated by suitable output indicator lamps such as the lamps 1K0 and 1K1, shown in the drawings, both of which would be lighted at this time since transistors X6 and X7 are both conducting.

A relatively small difference in the potential between the two summation lines 1W1 and 1W0, such as 0.05 volt, will cause the current to be unequally distributed between the transistors X3 and X4. If under these circumstances the input voltage on 1W0 is greater or more positive than 1W1, transistor X3 will conduct almost all of the current which in turn will hold ON transistor X6; but transistor X7 will be turned OFF as the voltage at the base of this transistor rises towards +6 volts. Conversely, if the voltage on the summation output line 1W1 is more positive than that on 1W0, transistors X4 and X7 conduct to provide a "1" output and turn OFF the "0" output. The adjustable voltage divider 63 in the emitter circuit of transistor X5 provides an adjustment to regulate the amount of sensitivity to which the balance detector unit will respond. Also, an adjustable resistor 65 is provided to center the null point within the insensitive zone. In a memory bank of 35 units, the minimum difference for one unit of weight may be arranged to be of some relatively low voltage such as 0.1 volt, for example, and the insensitive zone may be 0.05 volt on either side of the null point.

The conditioning of the adaptive memory units is accomplished by operation of a conditioning key which in turn controls a conditioning trigger, the output of the conditioning trigger being fed along with information from the balance decision units and a training switch input to appropriate logic circuits from whence a signal is supplied to a condition driver circuit which in turn supplies conditioning pulses to each of the adaptive memory units in the particular memory bank. Since all of the circuitry is similar, only one set of conditioning circuits will be described and it will be understood that the remainder are arranged in similar fashion. The conditioning key or switch CK is a spring loaded key which, in its normal condition, causes a conditioning trigger comprising two transistors X8 and X9 to assume one of its two stable states. When the conditioning key is operated, the trigger is switched to its other state and provides an output pulse, returning to its initial state when the key is released. The conditioning key trigger is conventional in construction, constituting a pair of NPN transistors X8 and X9 which are emitter coupled, and which have the biases changed thereon in accordance with the operation of the conditioning key CK. Suitable cross-coupling circuits are provided to insure that the one half of the trigger is turned off while the other is turned on and so forth. The output from the conditioning trigger is supplied to a common conditioning trigger output line CT0, which is supplied to a plurality of AND logic circuits associated with each memory bank. One such logic circuit is shown at 73 and constitutes a plurality of diodes connected to a load resistor and to a suitable source of energy in conventional fashion, so that inputs must be present at each of the three gating diodes in order to provide an output therefrom. The output from the AND circuit 73 is supplied to a conditioning driver indicated by the dotted rectangle 75 and comprising a pair of transistors X10 and X11, connected in such manner that an input pulse supplied from the AND circuit 73 will cause the conditioning driver to provide an output pulse on the conditioning line, such as 1C0, connected thereto. Sufficient power is provided by this driver to drive all of the adaptive memory units in the bank, in this particular instance 35. An R-C timing circuit from the collector of transistor X11 to the base of transistor X10 controls the duration of the output pulse so that a pulse of constant width is produced that is independent of the duration of the input pulse from the AND circuit 73.

The training of this system is under the control of a plurality of training switches, one for each bank, which are designated in binary code fashion by the reference characters 1T, 2T, 4T and 8T. These switches, when closed, establish a circuit from —12 volts to ground through an associated indication lamp, such as lamps 1TK, 2TK, 4TK and 8TK. With the switch open, the training signal lines, such as 1TS, connected to the switch have a negative potential supplied thereto through the lamp. When the switch is closed, the lamp is lighted and the potential on the line goes to ground. This difference in potential is supplied directly to one of the AND circuits, such as 85 and is supplied to the other AND circuits, such as 73, via an inverter, such as 87. The inverter comprises a PNP transistor connected in such manner that the input and output signals are inverted. The remaining input to the AND circuits in the conditioning portion of the system, such as the AND circuits 73 and 85 for the first bank, are supplied from the outputs of the balance decision unit associated with that particular bank; for example, the output signal from BDU1 at terminal 60 is supplied to one of the inputs to AND circuit 85 and the output from BDU1 at terminal 61 is also supplied to one of the inputs of AND circuit 73. It will be noted that the output from the balance decision unit indicating the "1" condition is fed back to the adaptive memory unit to influence the zero condition weighting while the output indicating the "0" condition for the balance decision unit 1 is fed back via AND circuit 85 and a conditioning driver 89 to the conditioning line 1C1 which weights the adaptive memory unit AM1 in a positive direction. Similar conditioning circuits with suitable inputs from the associated balance decision units and from the training switches are provided for each of the other banks in the system.

The reverse tare weight units, one for each memory bank, are constituted as shown in detail in FIG. 2*b*. The details of only one such unit RTW1 are shown, since all are similar. The unit comprises a pair of NPN transistors X13 and X14, having their collectors grounded through suitable load resistors and their emitters connected to —6 volts, as shown. The bases are grounded via resistors, such as R10 and R11, and inputs from the condition trigger output line CT0 and the training output and inverted training output lines from the first bank are supplied to the bases of X13 and X14 via diodes which function as AND inputs. The collectors of X13 and X14 are connected via suitable resistors to the adaptive memory output lines 1W0 and 1W1 respectively. In operation, assume first that the condition trigger output is OFF so that the potential on line CT0 is approximately —12 volts. Transistors X13 and X14 will both be cut off with the —12 volt potential applied to their bases via diodes D20 and D21. Their respective collectors will be near ground potential, and equal voltages or "weights" will be applied to lines 1W0 and 1W1 via resistors R12 and R13. Under these conditions, the applied voltages effectively cancel insofar as the balance detector unit is concerned, and the inverting balance is undistorted.

During conditioning, line CT0 rises to 0 volts, or ground potential, and either the desired output line 1TS or its inverse line, at the output of inverter 87 will be at 0 volts, depending upon whether switch 1T is closed or open. Consider the case wherein 1TS is at 0 volts. The inverted signal will then be at —12 volts, and, via diode D30, will hold transistor X13 cut off. Transistor X14 will conduct since both diodes D21 and D31 are reverse biased. Current then flows from ground through the resistor R11 to the base of X14, thence through the emitter of X14 to —6 volts. This saturates X14, with the collector at approximately —6 volts. Since the 1W1 line is also near —6 volts, the current in resistor R13 is reduced to practically zero. Because the current flowing to the 1W0 line has not changed, the net effect is to increase the weight tipping the balance to "zero." Thus, a desired output of "one" will produce a reverse tare weight for zero. It will be apparent that the action described is reversed for a desired output of "zero," which results in a reverse tare weight tending to tip the balance toward "one."

It should be noted that, in this embodiment, the reverse tare weight unit is rendered effective only during conditioning, under the control of the conditioning trigger. At other times, the reverse tare weight unit has no effect on the balance of the adaptive memory outputs.

It can be shown that the use of the reverse tare weight unit provides an increased separation between the weights accumulated in opposite directions and provides for more rapid "learning."

Referring now to FIG. 3, there is shown an adaptive memory unit similar to that shown in FIG. 2*b* and described above, but which is connected to function as an adaptive tare weight unit. Since the unit is nearly identical with that shown in FIG. 2*b*, it will not be described in detail. The only difference to note is that the input circuit is permanently grounded, so that, in effect, a continuous input is present for this unit; and, hence, it will respond to all conditioning pulses applied to the associated adaptive memory units in the same bank. One such adaptive unit is provided in each bank.

In operation, each time a conditioning pulse is supplied to a bank of adaptive memory units, the adaptive tare weight unit is conditioned in a direction determined by the particular conditioning pulse to thereby add weight to the adaptive memory unit output lines, irrespective of any changes in the adaptive memory units. It should be noted that in this case the weight is added in the same direction as the desired output and persists after the conditioning signal ceases. In most learning routines, the conditioning to "0" and "1" occurs at relatively alternate intervals and the net tare weight oscillates around the neutral state. If conditioning is unbalanced because of the nature of the inputs or the frequency of ones and zeros in the desired output, the adaptive tare weight memory will respond by producing a tare weight to favor the side most often conditioned. The end result is a tare weight to add to the side most in need of the weight to create the desired output.

The adaptive tare weight disclosed in FIG. 3 has five stable states including a null or neutral state. It should be understood that units having greater numbers of stable states can be used if desired.

In adapting a system to distinguish different combinations of inputs, a particular combination of inputs is entered into the memory by appropriately energizing selected elements of the input matrix which, via matrix expansion circuits, are entered into the adaptive memory with the desired output combination set up on the training switches. The conditioning key is then operated and those memory banks which indicate an output other than that desired are automatically conditioned by the signals supplied from the balance decision unit and the training switches via the AND circuits and conditioning drivers to shift the particular input-activated adaptive memory unit or units in the proper direction. A second set of inputs is then supplied to the input matrix and the process is repeated with the training switches being set to provide the selected output for the second set of inputs. After a first run of such training operations, it will be found necessary of course to return and recondition some of the adaptive memories, since they will shift back and forth during the memory process, and several runs through the learning process will be required before the system will adapt to a particular set of inputs with a particular set of outputs.

It will be apparent that the provision of both the reverse tare and the adaptive tare in the same system is simply achieved by providing both units as described above. The advantages of both arrangements are thereby secured.

From the foregoing, it will apparent that the present invention provides an improved adaptive logic system in which tare weight values may be supplied to the outputs of adaptive memory units to furnish extra weight thereto. Such tare weight may be either additive or subtractive, and it may be added only briefly to momentarily establish a particular output, or it may be persistent to maintain a particular output weight.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An adaptive logic system comprising, in combination, a plurality of adaptive memory units, each unit having a plurality of stable conditions to which the memory units may be set in response to input and conditioning signals supplied thereto, a source of input signals connected to said memory units, a source of conditioning signals connected to said memory units, a common output circuit connected to said memory units and having output signals thereon of different weights in accordance with the conditions of the memory units, and means for varying the weight of said output signals independently of said memory units.

2. An adaptive logic system comprising, in combination, a plurality of metastable memory units, each unit having a plurality of stable conditions on each side of a neutral condition, each said memory unit having two output circuits, the output signals on said circuits being balanced when said memory unit is in its neutral condition and unbalanced in one direction or the other when said unit is displaced to one side or the other of said neutral condition;

input means connected to said memory units for setting said units in selected conditions;

conditioning means connected to said memory units for controlling the conditioning of said memory units;

a pair of memory output signal lines connected to the output circuits of all of said memory units;

means for detecting the balanced or unbalanced condition of signals on said output signal lines; and means for modifying the signals on said output signal lines independently of the outputs of said memory units.

3. An adaptive logic system comprising, in combination, a plurality of adaptive memory units, each unit having a plurality of stable conditions to which the memory units may be set in response to input and conditioning signals supplied thereto, a source of input signals connected to said memory units, a source of conditioning signals connected to said memory units, a common output circuit connected to said memory units and having output signals thereon of different weights in accordance with the conditions of the memory units, and means for varying the weight of said output signals independently of said memory units and opposing the net weight of said memory unit output signals.

4. An adaptive logic system comprising, in combination, a plurality of metastable memory units, each unit having a plurality of stable conditions on each side of a neutral condition, each said memory unit having two output circuits, the output signals on said circuits being balanced when said memory unit is in its neutral condition and unbalanced in one direction or the other when said unit is displaced to one side or the other of said neutral condition;

input means connected to said memory units for setting said units in selected conditions;

conditioning means connected to said memory units for controlling the conditioning of said memory units;

a pair of memory output signal lines connected to the output circuits of all of said memory units;

means for detecting the balanced or unbalanced condition of signals on said output signal lines; and means for modifying the signals on said output lines independently of and in opposition to the outputs from said memory units.

5. An adaptive logic system comprising, in combination, a plurality of metastable memory units, each unit having a plurality of stable conditions on each side of a neutral condition, each said memory unit having two output circuits, the output signals on said circuits being balanced when said memory unit is in its neutral condition and unbalanced in one direction or the other when said unit is displaced to one side or the other of said neutral condition;

input means connected to said memory units for setting said units in selected conditions;

a pair of memory output signal lines connected to the output circuits of all of said memory units;

balance detection means connected to said output signal lines and responsive to signals on said lines to provide a first output when the signals on said memory output lines are equal, a second output when the signals on said memory output lines are unbalanced in a first relation, and a third output when the signals on said memory output lines are unbalanced in a second relation;

conditioning means for controlling the conditioning of said memory units to selected conditions in response to input signals, said conditioning means being controlled by said balance detection means to condition said memory units in a direction to displace said units from the condition indicated by said balance detection means;

means for indicating the first, second and third outputs from said balance detection means; and tare weighting means for opposing the output signals from said memory units on said output signal lines to thereby reduce the unbalance, if any, on said lines.

6. An adaptive logic system comprising, in combination, a plurality of adaptive memory units, each unit having a plurality of stable conditions to which the memory units may be set in response to input and conditioning signals supplied thereto, a source of input signals connected to said memory units, a source of conditioning signals connected to said memory units, a common output circuit connected to said memory units and having output signals thereon of different weights in accordance with the conditions of said memory units, and adaptive weighting means connected to said source of conditioning signals and said output circuit for additively varying the weight of said output signals independently of said memory units and controlled by said conditioning signals.

7. An adaptive logic system comprising, in combination, a plurality of adaptive memory units, each unit having a plurality of stable conditions to which the memory units may be set in response to input and conditioning signals supplied thereto, a source of input signals connected to said memory units, a source of conditioning signals connected to said memory units, a common output circuit connected to said memory units and having output signals thereon of different weights in accordance with the conditions of said memory units, and adaptive weighting means connected to said source of conditioning signals and said output circuit for additively modifying the signals on said output circuit independently of the output of said memory units.

8. An adaptive logic system comprising, in combination, a plurality of metastable memory units, each unit having a plurality of stable conditions on each side of a neutral condition, each said memory unit having two output circuits, the output signals on said circuits being balanced when said memory unit is in its neutral condition and unbalanced in one direction or the other when said unit is displaced to one side or the other of said neutral condition;

input means connected to said memory units for setting said units in selected conditions;

a pair of memory output signal lines connected to the output circuits of all of said memory units;

balance detection means connected to said output signal lines and responsive to signals on said lines to provide a first output when the signals on said memory output lines are equal, a second output when the signals on said memory output lines are unbalanced in a first relation, and a third output when the signals on said memory output lines are unbalanced in a second relation;

conditioning means for controlling the conditioning of said memory units to selected conditions in response to input signals, said conditioning means being controlled by said balance detecting means to condition said memory units in a direction to displace said units from the condition indicated by said balance detection means;

means for indicating the first, second and third outputs from said balance detecting means; and adaptive tare weight means for supplying additional signals to said memory output lines.

References Cited by the Examiner

UNITED STATES PATENTS

| | | | |
|---|---|---|---|
| 3,021,440 | 2/1962 | Anderson | 340—172.5 |
| 3,022,005 | 2/1962 | Dickinson | 235—152 |
| 3,106,699 | 10/1963 | Kamentsky | 340—172.5 |
| 3,158,840 | 11/1964 | Baskin | 340—172.5 |
| 3,209,328 | 9/1965 | Bonner | 340—172.5 |
| 3,235,844 | 2/1966 | White | 340—172.5 |

ROBERT C. BAILEY, *Primary Examiner.*

J. P. VANDENBURG, *Assistant Examiner.*